United States Patent
Hansen et al.

(10) Patent No.: US 7,435,451 B1
(45) Date of Patent: Oct. 14, 2008

(54) COATING WITH SIDES OF AMINE CURING AGENT AND RUBBER TOUGHENER, AND EPOXY RESIN AND EPOXIDE-CONTAINING TOUGHENER

(75) Inventors: George P. Hansen, Austin, TX (US); Rock A. Rushing, Spicewood, TX (US); John W. Bulluck, Spicewood, TX (US); Joshua B. Lightfoot, Austin, TX (US); Brad A. Rix, Spicewood, TX (US)

(73) Assignee: Texas Research International, Inc., Austin, TX (US)

(*) Notice: Subject to any disclaimer, the term of this patent is extended or adjusted under 35 U.S.C. 154(b) by 401 days.

(21) Appl. No.: 11/415,862

(22) Filed: May 2, 2006

Related U.S. Application Data

(60) Division of application No. 10/683,976, filed on Oct. 10, 2003, now Pat. No. 7,037,958, which is a continuation-in-part of application No. 09/939,204, filed on Aug. 24, 2001, now Pat. No. 6,632,860.

(51) Int. Cl.
*B05D 1/02* (2006.01)
*B05D 1/28* (2006.01)
*B05D 1/38* (2006.01)
*C08K 3/22* (2006.01)
*C08K 7/14* (2006.01)
*C08L 63/00* (2006.01)
*C08L 63/02* (2006.01)

(52) U.S. Cl. .............. 427/428.01; 427/410; 427/421.1; 523/428; 523/434; 525/113

(58) Field of Classification Search .............. None
See application file for complete search history.

(56) References Cited

U.S. PATENT DOCUMENTS

| | | | |
|---|---|---|---|
| 3,962,168 A | 6/1976 | Edwards | 260/29.6 |
| 4,205,109 A | 5/1980 | France et al. | 428/150 |
| 4,292,213 A | 9/1981 | Elliott et al. | 260/2.3 |
| 4,708,978 A | 11/1987 | Rodgers | 524/5 |
| 4,744,725 A | 5/1988 | Matarese et al. | 415/172 |
| 4,760,103 A | 7/1988 | Kraft et al. | 523/150 |
| 4,774,278 A | 9/1988 | Yoshioka et al. | 524/506 |
| 4,859,522 A | 8/1989 | Cambon | 428/215 |
| 4,961,973 A | 10/1990 | Molnar | 427/423 |
| 5,077,137 A | 12/1991 | Molnar | 428/601 |
| 5,084,521 A | 1/1992 | White | 523/436 |
| 5,094,902 A | 3/1992 | Haenggi et al. | 428/150 |
| 5,110,657 A | 5/1992 | Ainslie | 428/141 |
| 5,124,178 A | 6/1992 | Haenggi et al. | 427/204 |
| 5,198,065 A * | 3/1993 | Eadara | 156/315 |
| 5,367,024 A | 11/1994 | Neckermann | 525/123 |
| 5,395,673 A | 3/1995 | Hunt | 428/148 |
| 5,431,960 A | 7/1995 | Watts | 427/359 |
| 5,445,670 A | 8/1995 | Each et al. | 106/3 |
| 5,494,729 A | 2/1996 | Henry et al. | 428/147 |
| 5,561,173 A | 10/1996 | Dry | 523/218 |
| 5,660,624 A | 8/1997 | Dry | 106/677 |
| 5,686,507 A | 11/1997 | Hermele et al. | 523/153 |
| 5,989,328 A | 11/1999 | Stahovic et al. | 106/36 |
| 5,989,334 A | 11/1999 | Dry | 106/677 |
| 5,990,234 A | 11/1999 | Stahovic et al. | 524/839 |
| 6,248,204 B1 | 6/2001 | Schuft | 156/305 |

FOREIGN PATENT DOCUMENTS

JP 6-145630 A * 5/1994

* cited by examiner

*Primary Examiner*—Robert Sellers
(74) *Attorney, Agent, or Firm*—O'Keefe, Egan, Peterman & Enders, LLP

(57) ABSTRACT

This invention concerns an epoxy coating for use as a nonskid surface for applications such as the deck of an aircraft carrier. The epoxy coating can be formulated from (a) an amine curing agent, (b) an epoxide-containing toughening agent such as a polysulfide and/or a polythioether, (c) an epoxy resin, (d) a rubber toughening agent, and (e) an optional fire retardant, a glass fiber thixotrope and impact toughening agent, an optional pigment, an optional corrosion inhibitor, an optional moisture penetration inhibitor, an optional ultraviolet light stabilizer, an optional abrasive aggregate, or a combination thereof.

5 Claims, No Drawings

COATING WITH SIDES OF AMINE CURING AGENT AND RUBBER TOUGHENER, AND EPOXY RESIN AND EPOXIDE-CONTAINING TOUGHENER

This application is divisional of application Ser. No. 10/683,976, filed Oct. 10, 2003 now U.S. Pat. No. 7,037,958, which is a continuation-in-part of application Ser. No. 09/939,204, filed Aug. 24, 2001, now U.S. Pat. No. 6,632,860, the entirety of which applications are incorporated herein by reference.

Subject to rights of the assignee afforded under a Small Business Innovation Research program, the U.S. Government has a paid-up license in this invention and the right in limited circumstances to require the patent owner to license others on reasonable terms as provided for by the terms of contract number N00024-00-C-4080 awarded by the Department of the Navy.

BACKGROUND OF INVENTION

This invention pertains to an epoxy useful, for example, as a coating for aircraft carrier decks.

It is important that many surfaces are made of a non-skid coating. For instance, it is desirable that the deck of an aircraft carrier be made of a non-skid surface. It is also desirable that such surfaces be durable. This is particularly true for the portion of the deck where the aircraft take off and land, which is exposed to severe wear. Currently, the aircraft decks are made using solvent-based epoxy coatings, which are applied so as to form ridges.

The present inventors have recognized, however, that there exists a need for a more durable coating, and a coating made without solvents. The present inventors have also recognized that a coating lacking volatile solvents would be desirable so as to avoid use of solvents that can be hazardous, and which must be evaporated off to provide the final coating.

SUMMARY OF INVENTION

This invention solves one or more of the problems and disadvantages described above.

In one broad respect, this invention is a process useful for providing a coating for a solid surface, comprising: applying a primer onto the solid surface to form a primer coating, wherein the primer is prepared from an amine curing agent, an epoxide-containing toughening agent, an epoxy resin, a rubber toughening agent, an optional fire retardant, optionally a glass fiber thixotrope and impact toughening agent, and a pigment; applying a topcoat onto the primer coating, wherein the topcoat is prepared from an amine curing agent, an epoxide-containing toughening agent, an epoxy resin, a rubber toughening agent, an optional fire retardant, optionally a glass fiber thixotrope and impact toughening agent, a pigment, and an optional abrasive aggregate. For spray applications, and especially for the primer, it may sometimes be desirable to omit the fiber and/or the aggregate. By contrast, the glass fiber, while optional, is generally present in a topcoat formulation. In one embodiment, the epoxide-containing toughening agent is a polysulfide, a polythioether, or a combination thereof. In another broad respect, this invention is an epoxy topcoat comprising a cured mixture that is formulated from an epoxy resin, an epoxide-containing toughening agent, optionally, an ultraviolet light stabilizer, a pigment, optionally a glass fiber thixotrope and impact toughening agent, an optional abrasive aggregate, an optional fire retardant, an amine curing agent, and a rubber toughening agent.

In another broad respect, this invention is an epoxy primer comprising a cured mixture that is made from an amine curing agent, an epoxide-containing toughening agent, an optional fire retardant, optionally a glass fiber thixotrope and impact toughening agent, an epoxy resin, a rubber toughening agent, a pigment, optionally, a corrosion inhibitor, and optionally, a moisture penetration inhibitor.

In another broad respect, this invention is a process useful for providing a coating for a solid surface, comprising: applying a coating onto the solid surface, wherein the coating is prepared from an amine side which comprises a mixture of: an amine curing agent, a rubber toughening agent; and an epoxy side which comprises a mixture of: an epoxy resin, an epoxide-containing toughening agent, and wherein the coating is also prepared from an optional fire retardant, optionally a glass fiber thixotrope and impact toughening agent, a pigment, and an optional abrasive aggregate, and wherein the surface may be primed or un-primed prior to application of the topcoat. In another broad respect this invention is a method of manufacturing an epoxy side and an amine side for use in the formation of a coating, comprising: forming a mixture of an amine side from an amine curing agent and a rubber toughening agent, forming a mixture of an epoxy side from an epoxy resin and an epoxide-containing toughening agent, wherein the amine side is also formed from an optional fire retardant, an optional glass fiber thixotrope and impact toughening agent, a pigment, an optional abrasive aggregate, a moisture penetration inhibitor, an ultraviolet light stabilizer, or combination thereof, and wherein the epoxy side is also formed from an optional fire retardant, an optional glass fiber thixotrope and impact toughening agent, a pigment, an optional abrasive aggregate, a moisture penetration inhibitor, an ultraviolet light stabilizer, or combination thereof. In another broad respect, this invention is an epoxy coating formulated from (a) an amine curing agent, (b) an epoxide-containing toughening agent, (c) an epoxy resin, (d) a rubber toughening agent, and (e) an optional fire retardant, an optional glass fiber thixotrope and impact toughening agent, a pigment, a corrosion inhibitor, a moisture penetration inhibitor, an ultraviolet light stabilizer, an optional abrasive aggregate, or a combination thereof. In another broad respect, this invention is a process useful for providing a coating for a solid surface, comprising: applying a coating onto the solid surface, wherein the coating is prepared from (a) an amine curing agent, (b) an epoxide-containing toughening agent, (c) an epoxy resin, (d) a rubber toughening agent, and (e) an optional fire retardant, an optional glass fiber thixotrope and impact toughening agent, a pigment, a corrosion inhibitor, a moisture penetration inhibitor, an ultraviolet light stabilizer, an optional abrasive aggregate, or a combination thereof.

In one broad respect, this invention is a process useful for providing a coating for a solid surface, comprising: applying a primer onto the solid surface to form a primer coating, wherein the primer is prepared from an amine curing agent, a polysulfide and/or polythioether toughening agent, an epoxy resin, a rubber toughening agent, an optional fire retardant, an optional glass fiber thixotrope and impact toughening agent, and a pigment; applying a topcoat onto the primer coating, wherein the topcoat is prepared from an amine curing agent, a polysulfide toughening agent, an epoxy resin, a rubber toughening agent, an optional fire retardant, an optional glass fiber thixotrope and impact toughening agent, a pigment, and an optional abrasive aggregate. As used herein, "coating" may refer to either the primer, the topcoat, a generic mixture formed from the components described herein, or combinations thereof.

In general, a coating of this invention may be prepared from (formulated from), independently in each occurrence, about 20 to about 60 percent of the amine curing agent; about 0.01 to about 30 percent of the polysulfide and/or polythioether toughening agent; about 0.01 to about 15 percent based on the total weight of the coating of the corrosion inhibitor; about 0.01 to about 10 percent based on the total weight of the coating of the glass fiber; about 0.01 to about 3 percent based on the total weight of the coating of an moisture penetration inhibitor; about 0.01 to about 35 percent based on the total weight of the coating of the fire retardant; about 10 to about 90 percent based on the total weight of the coating of the epoxy resin; 4 to about 40 percent based on the total weight of the coating of the rubber toughening agent; about 0.01 to about 30 percent based on the total weight of the coating of the pigment. About 0.01 to about 10 percent based on the total weight of the coating of the ultraviolet light stabilizer; and/or about 0.01 to about 45 percent based on the total weight of the coating of the abrasive aggregate.

In one broad respect, this invention is a process useful for providing a coating for a solid surface, comprising: applying a primer onto the solid surface to form a primer coating on the surface, wherein the primer is prepared from a first amine side which comprises a mixture of: an amine curing agent, a toughening agent, at least one corrosion inhibitor, a moisture penetration inhibitor, an optional fire retardant, and an optional glass fiber thixotrope and impact toughening agent; a first epoxy side which comprises a mixture of: an epoxy resin, a toughening agent, at least one corrosion inhibitor, a moisture penetration inhibitor, a darkening pigment, and an optional glass fiber thixotrope and impact toughening agent, applying a topcoat onto the primer coating, wherein the topcoat is prepared from a second amine side which comprises a mixture of: an amine curing agent, a toughening agent, an ultraviolet light absorber and stabilizer, an optional fire retardant, an infrared light reflecting pigment, an optional glass fiber thixotrope and impact toughening agent, and an optional abrasive aggregate, and a second epoxy side which comprises a mixture of: an epoxy resin, a toughening agent, an optional glass fiber thixotrope and impact toughening agent, an ultraviolet light absorber and stabilizer, and an optional abrasive aggregate.

In one embodiment, the first amine side comprises about 40 to about 60 percent of the amine curing agent, about 10 to about 30 percent of the toughening agent, about 0.01 to about 6 percent of at least one corrosion inhibitor, about 0.01 to about 5 percent of the glass fiber, about 0.01 to about 3 percent of the moisture penetration inhibitor, and/or about 10 to about 35 percent of the fire retardant.

In one embodiment, the first epoxy side comprises about 50 to about 90 percent of the epoxy resin, about 10 to about 40 percent of the toughening agent, about 0.01 to about 6 percent of the corrosion inhibitor, about 0.01 to about 15 percent of the pigment, and/or about 0.01 to about 2 percent of the glass fiber.

In one embodiment, the second amine comprises about 25 to about 50 percent of the amine curing agent, about 0.01 to about 10 percent of the toughening agent, about 0.01 to about 6 percent of the corrosion inhibitor, about 15 to about 25 percent of the pigment, about 0.01 to about 45 percent of the abrasive aggregate, about 0.01 to about 5 percent of the glass fiber, and/or about 5 to about 15 percent of the fire retardant.

In one embodiment, the second epoxy side comprises about 20 to about 45 percent of the epoxy resin, about 8 to about 20 percent of the toughening agent, about 0.01 to about 6 percent of the corrosion inhibitor, about 0.01 to about 10 percent of the ultraviolet light stabilizer, about 0.01 to about 15 percent of the pigment, and/or about 0.01 to about 5 percent of the glass fiber.

In another broad respect, this invention is an epoxy topcoat comprising a cured mixture that is formulated from an epoxy resin, a polysulfide and/or polythioether toughening agent, optionally, an ultraviolet light stabilizer, a pigment, an optional glass fiber thixotrope and impact toughening agent, an optional abrasive aggregate, an optional fire retardant, an amine curing agent, and a rubber toughening agent.

In another broad respect, this invention is an epoxy primer comprising a cured mixture that is made from an amine curing agent, a polysulfide and/or polythioether toughening agent, an optional fire retardant, an optional glass fiber thixotrope and impact toughening agent, an epoxy resin, a rubber toughening agent, a pigment, optionally, a corrosion inhibitor, and optionally, a moisture penetration inhibitor.

In another broad respect, this invention is a process useful for providing a coating for a solid surface, comprising: applying a coating onto the solid surface, wherein the coating is prepared from an amine side which comprises a mixture of: an amine curing agent, a rubber toughening agent; and an epoxy side which comprises a mixture of: an epoxy resin, an epoxy-terminated polysulfide and/or polythioether toughening agent, and wherein the coating is also prepared from an optional fire retardant, an optional glass fiber thixotrope and impact toughening agent, a pigment, and an abrasive aggregate, and wherein the surface may be primed or un-primed prior to application of the topcoat.

The primer is used to promote adhesion of the non-skid topcoat and to inhibit corrosion of a metal substrate to which the primer may be applied. Either or both of the primer sides may include an ultraviolet light absorber and stabilizer. In one embodiment, the second amine side or the second epoxy side or both may include a pigment, such as a darkening pigment. In one embodiment the epoxy side and amine side include different pigments (e.g., one is white and one is black) to assist the user in achieving adequate mixing of the two sides.

In one embodiment, the topcoat is applied in a manner such that a plurality of ridges are formed by the topcoat such as by rolling, trowelling, raking or spraying. The rolling can be through use of a phenolic napless roller of a design such that upon application, ridges and valleys are formed to supply additional slip resistance. For many applications, the topcoat may be applied using one gallon of topcoat for every 20-30 square feet of surface to be coated. The topcoat may be applied to the primer as soon as the primer is cured to a tack free state. Typically, the topcoat is tack free within 1 to 48 hours after being applied, depending on temperature and other conditions. In general, hotter ambient temperatures lead to shorter tack free times. Alternatively, the topcoat is applied prior to the primer reaching a tack free state and may be applied promptly after the primer is applied.

In another broad respect, this invention is a method of manufacturing an epoxy side and an amine side for use in the formation of a coating, comprising: forming a mixture of an amine side from an amine curing agent and a rubber toughening agent, forming a mixture of an epoxy side from an epoxy resin and a polysulfide and/or polythioether toughening agent, wherein the amine side is also formed from an optional fire retardant, an optional glass fiber thixotrope and impact toughening agent, a pigment, an optional abrasive aggregate, a moisture penetration inhibitor, an ultraviolet light stabilizer, or combination thereof, and wherein the epoxy side is also formed from an optional fire retardant, an optional glass fiber thixotrope and impact toughening agent, a pigment, an optional abrasive aggregate, a moisture penetration inhibitor, an ultraviolet light stabilizer, or combination thereof.

In another broad respect, this invention is a process useful for providing a coating for a solid surface, comprising: applying a coating onto the solid surface, wherein the coating is prepared from (a) an amine curing agent, (b) a polysulfide toughening agent, (c) an epoxy resin, (d) a rubber toughening agent, and (e) an optional fire retardant, an optional glass fiber thixotrope and impact toughening agent, a pigment, a corrosion inhibitor, a moisture penetration inhibitor, an ultraviolet light stabilizer, an optional abrasive aggregate, or a combination thereof.

The surfaces to be coated may include metal surfaces such as but not limited to the deck of a ship, including the deck of an aircraft carrier, the surface of an oil well drilling platform, an industrial walkway and other industrial or utility thoroughfares.

The composition may include at least one moisture penetration inhibitor in the first amine side and at least one moisture penetration inhibitor in the first epoxy side. In one embodiment, the amine curing agent side is white and the epoxy side is black (or vice versa) so that when mixed, a gray color is created. This is advantageous for purposes of handling, mixing, and application of the materials.

In one aspect, the toughening agent may be a polythioether toughening agent or a polysulfide toughening agent.

In one respect, the abrasive aggregate is comprised of a mixture of coarse aluminum powder and aluminum pellets.

In another respect, this invention is a coating composite formed by application of a topcoat layer to a primer layer. The topcoat and primer may be made from the epoxy and amine sides described herein. The laminate can thus be described as a composition comprising a topcoat layer adhered or bonded to a primer layer. In some instances where corrosion of the substrate is not likely, the primer is not necessary, since the topcoat adhesion is adequate; that is, it is self priming.

In another broad respect, this invention is a process useful for making a non-skid coating kit, comprising a first amine side and first epoxy side of a primer and a second amine side and a second epoxy side of a topcoat, wherein the process comprises: (a) combining an amine curing agent, a toughening agent, a corrosion inhibitor, and an optional fire retardant to form the first amine side; adding the first amine side to a first container and then sealing the container; (b) combining an epoxy resin, a toughening agent, a corrosion inhibitor, an ultraviolet light stabilizer, a pigment, and an optional thixotrope glass fiber reinforcing agent to form the first epoxy side; adding the first epoxy side to a second container and then sealing the container; (c) combining an amine curing agent, a rubber toughening agent, a corrosion inhibitor, an ultraviolet light absorber and stabilizer, an optional fire retardant, a thixotrope glass fiber reinforcing agent to form the second amine side to a container and then sealing the container; and (d) combining an epoxy resin, a toughening agent, a pigment, an optional thixotrope glass fiber reinforcing agent, an ultraviolet light absorber and stabilizer, and an optional aggregate to form the second epoxy side; adding the second epoxy side to a second container and then sealing the container.

This invention thus provides a coating useful for applications such as but not limited to the deck of an aircraft carrier. Advantageously, the coating may be made from 100% solids components obtained from a supplier without further dilution, i.e., without the addition of volatile solvents. As used herein, a solvent such as water or an organic compound refers to materials that dissolves the epoxy resin and/or amine starting materials, and which evaporates from the coating upon application and/or exposure to an open environment (such as to air). Representative examples of such volatile organic solvents that may be advantageously absent from the components used to make the final coating include low molecular weight halogenated hydrocarbons such as chloroform and carbon tetrachloride, hydrocarbons, alcohols, ketones, ethers, glycol ethers, and so forth. In the practice of this invention, the starting materials and final cured coating are substantially free of solvents, containing at most only minor amounts of such solvents and no more than about 40 percent of the component weight. Advantageously, the coating has excellent durability and has improved durability relative to the solvent-based coatings currently in use.

The type of substrates and surfaces on which the coating of this invention may be used vary widely. For example, the type of surfaces that can be treated with the coating of this invention includes glass, ceramics, metals, and plastics. Typically, the surface is metal.

DETAILED DESCRIPTION OF THE INVENTION

The final cured coating of this invention has a thickness which can vary widely depending on the end use. In general, the coating has a thickness of from about 0.1 cm to about 2 cm, though thicknesses above and below these thicknesses are anticipated.

The epoxy resin used in the practice of this invention may vary and includes conventional, commercially available epoxy resins. Two or more epoxy resins may be employed in combination. In general, the epoxy resins can be glycidated resins, cycloaliphatic resins, epoxidized oils, and so forth. The glycidated resins are frequently the reaction product of a glycidyl ether, such as epichlorohydrin, and a bisphenol compound such as bisphenol A. $C_4$-$C_{28}$ alkyl glycidyl ethers; $C_2$-$C_{28}$ alkyl- and alkenyl-glycidyl esters; $C_1$-$C_{28}$ alkyl-, mono- and poly-phenol glycidyl ethers; polyglycidyl ethers of pyrocatechol, resorcinol, hydroquinone, 4,4'-dihydroxydiphenyl methane (or bisphenol F), 4,4'-dihydroxy-3,3'-dimethyldiphenyl methane, 4,4'-dihydroxydiphenyl dimethyl methane (or bisphenol A), 4,4'-dihydroxydiphenyl methyl methane, 4,4'-dihydroxydiphenyl cyclohexane, 4,4'-dihydroxy-3,3'-dimethyldiphenyl propane, 4,4'-dihydroxydiphenyl suflone, and tris (4-hydroxyphynyl)methane; polyglycidyl ethers of the chlorination and bromination products of the above-mentioned diphenols; polyglycidyl ethers of novolacs; polyglycidyl ethers of diphenols obtained by esterifying ethers of diphenols obtained by esterifying salts of an aromatic hydrocarboxylic acid with a dihaloalkane or dihalogen dialkyl ether; polyglycidyl ethers of polyphenols obtained by condensing phenols and long-chain halogen paraffins containing at least two halogen atoms; N,N'-diglycidylaniline; N,N'-dimethyl-N,N'-diglycidyl-4,4'-diaminodiphenyl methane; N,N,N',N'-tetraglycidyl-4,4'-diaminodiphenyl methane; N,N'-diglycidyl-4-aminophenyl glycidyl ether; N,N,N',N'-tetraglycidyl-1,3-propylene bis-4-aminobenzoate; phenol novolac epoxy resin; cresol novolac epoxy resin; and combinations thereof. Representative non-limiting examples of epoxy resins useful in this invention include bis-4,4'-(1-methylethylidene) phenol diglycidyl ether and (chloromethyl) oxirane Bisphenol A diglycidyl ether. Commercially available epoxy resins that can be used in the practice of this invention include but are not limited to Aralydyte GY6010 and Epon 828. The epoxy resin can be used in any amount effective to form a coating of this invention. In general, the amount of epoxy resin used in the first epoxy side for the primer is from about 50 to about 90 percent by weight, and from about 20 to about 45 percent in the second epoxy side for topcoat. The epoxy resin is thinner (less viscous) than the type of resin used to make solvent-based epoxy coatings. Typically, the epoxy resin has a viscosity of from about 11,000 to about 14,000 centipoise.

The toughening agent used in the practice of this invention provides toughening and durability characteristics to the coating. By toughening it is meant that the material has imparted to it a greater impact strength. The toughening agent may be selected from conventional toughening agents such as rubber toughening agents and an epoxide-containing toughening agent such as polysulfide, polythioether polymer, aliphatic triglycidyl ether, a polyepoxide, aliphatic monoglycidyl ether, and aliphatic epoxy resin toughening agents. The toughening agent can vary. The polysulfide toughening agent may be an epoxy terminated polysulfide polymer. One representative formula for such materials is:

where n may be from 1 to 1,000. It is believed that the polysulfide toughening agent reacts during the epoxy curing to the amine function of the curing agent. Such compounds are well known, and are currently available commercially under the tradename ELP-3, sold by Rohm & Haas, or EPS-25, sold by Akzo Nobel. The polysulfide toughening agent is epoxy terminated and can react with the amine curing agent, but is stable in the epoxy resin. Another representative toughening agent is a polythioether toughening agent such as an epoxy terminated difunctional polythioether polymer, such as an epoxy terminated difunctional polythioether polymer sold commercially as PERMAPOL L-5534, including an low viscosity epoxy terminated difunctional polythioether polymer having an epoxy equivalent weight in the range from about 515 to about 550, a flash point above 230 F, and a viscosity at 25 C of from about 5 to about 6 mPa·s (ASTM D445). It should be appreciated that a polythioether has —S— linkage(s), as opposed to a polysulfide which has —S—S— linkage(s). Advantageously, in contrast to the polysulfide, the polythioether has less viscosity which imparts the ability to use less of it to achieve the same rheology in a given formulation, such as 60% of the amount needed relative to the polysulfide. The polythioether provides improved rheology, impact resistance and wear resistance relative to the polysulfide toughening agent. In one embodiment, the toughening agent is one or more of an epoxide-containing toughening agent. In another embodiment, the toughening agent is one or more of an epoxide-containing toughening agent that contains sulfur. In another embodiment, the toughening agent is a polysulfide, a polythioether, or a combination thereof. The following include additional toughening agents that do not contain sulfur. These toughening agents contain ether linkages between consecutive epoxy functional groups which provide flexibility. The low viscosities of these toughening agents improve the rheology. Another representative toughening agent is an aliphatic triglycidyl ether, such as a low viscosity aliphatic triglycidyl ether sold commercially as HELOXY Modifier 48, including aliphatic triglycidyl ether having an epoxy group content in the range from about 6400 to about 7500 mmol/kg and a viscosity at 25 C of from about 125 to about 250 mPa·s (ASTM D445). A representative formula for such trifunctional aliphatic triglycidyl ethers is:

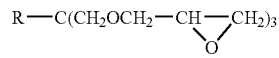

where R is a lower alkyl, such a $C_1$-$C_4$ alkyl, and in one embodiment ethyl.

Another representative toughening agent is a polyepoxide modifier, such as a low viscosity polyepoxide modifier sold commercially as HELOXY Modifier 505, including polyepoxide modifier having an epoxy group content in the range from about 1500 to about 1900 mmol/kg and a viscosity at 25 C of from about 300 to about 500 mPa·s (ASTM D445). For example, the polyepoxide can be a polyglycidyl ether of castor oil, including a trigycidyl ether of castor oil. Another representative toughening agent is an aliphatic monoglycidyl ether containing alkyl chains which are predominantly C8 to C10 in length, such as an aliphatic monoglycidyl ether containing alkyl chains which are predominantly C8 to C10 in length sold commercially as HELOXY Modifier 7, including an aliphatic monoglycidyl ether containing alkyl chains which are predominantly C8 to C10 in length modifier having an epoxy group content in the range from about 4200 to about 4600 mmol/kg and a viscosity at 25 C of from about 3 to about 5 mPa·s (ASTM D445). A representative formula for such an aliphatic monoglycidyl ether is:

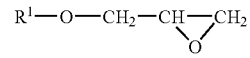

where $R^1$ is an alkyl of from 4 to 14 carbons in one embodiment is $C_4$, in one embodiment is $C_8$-$C_{10}$. Another representative toughening agent is a low viscosity aliphatic epoxy resin, such as an low viscosity aliphatic epoxy resin sold commercially as EPIKOTE resin 877, including an low viscosity aliphatic epoxy resin having an epoxy group content in the range from about 2900 to about 3300 mmol/kg and a viscosity at 25 C of from about 40 to about 90 mPa·s (ASTM D445). Another representative toughening agent is a bispheonal A type epoxy resin, such as an internally flexible bisphenol A epoxy resin sold commercially as ARALDITE PY 4122 US, including an bisphenol A epoxy resin having an epoxy equivalent amount of about 330 to about 365 g/eq. and a viscosity at 25 C of from about 40 to about 90 mPa·s (ASTM D445). A representative formula of such bisphenol A type epoxy resin toughening agents is as follows:

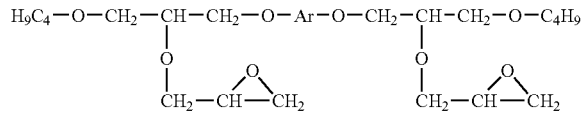

wherein Ar represents a —$C_6H_4$—$C(CH_3)_2$—$C_6H_4$— diradical group.

A toughening agent functions to improve impact resistance. Toughening agents function by forming a secondary phase within the polymer matrix. This secondary phase is rubbery and hence is capable of crack growth arrestment. This crack arresting function provides improved impact toughness.

Representative examples of a rubber toughening agents includes amine-terminated butadiene nitrile (ATBN) and carboxy-terminated butadiene nitrile (CTBN). ATBN is amine terminated so that it can react with the epoxy functionality and is stable upon mixture with an amine curing agent; as such the rubber toughening agent is generally present in the amine side of a formulation, if there are an amine side and epoxy side. Representative examples of an epoxy-containing toughening agent are polysulfide toughening agents, polythioether toughening agents, and combinations thereof. The epoxy-terminated toughening agents are normally present in the epoxy side of a formulation, if there are an amine side and an epoxy side. The ability of ATBN or the polysulfide toughening agent to react with their resin complements allows for good chemical bonding between separate phases (rubber and resin).

The abrasive aggregate may be selected from a wide variety of materials. The abrasives are employed in amounts effective to provide additional anti-skid properties to the coating. Representative examples of such abrasives include metals such as aluminum, pumice, garnet, sand, gravel, silica, ceramic fibers or whiskers such as of magnesium oxide, aluminum nitride, boron nitride, zinc oxide, aluminum oxide, crushed glass, quartz, polymer, rubber, and combinations thereof. The aggregate is employed in a wide range of amounts. In general, the aggregate is used in an amount of from about 20 to about 50 percent by weight of the second amine side, and from about 25 to about 60 percent of second epoxy side. The aggregate serves to provide filler material and an abrasive surface.

The coating of this invention includes a glass fiber, which provides both thixotropic rheology modification as well as an impact toughening agent. Such glass fibers include those having an average fiber diameter of about 0.2 to about 5 microns and a surface area as measured by BET of about 0.01 to about 25 meters squared per gram ($m^2/g$). In one embodiment, the BET is about 0.3 to about 6.25 $m^2/g$. In the first amine side, the amount of glass fiber may be from about 0.01 to about 5 percent; from about 0.01 to about 2 percent for the first epoxy side; from about 0.01 to about 5 percent for the second amine side, and from about 0.01 to about 5 percent for the second epoxy side.

For the primers, one or more corrosion inhibitors may be included. These serve to reduce the amount of corrosion of a metal substrate at the primer/surface interface. A wide variety of such corrosion inhibitors may be used. Representative examples of such corrosion inhibitors include zinc-based inhibitors such as zinc phosphate, zinc-5-nitro-isophthalate, zinc molybdate, and zinc oxide and hydrophobic, moisture penetration inhibitors such as hydrophobic, amorphous fumed silica. These may be used in any amount effective to provide corrosion inhibition.

In the practice of this invention, a UV light stabilizer may be included. This serves to protect the cured coating from the harmful effects of UV light. Representative examples of such stabilizers include sterically hindered piperidine derivatives including an alkyl substituted hydroxy piperidines such as dimethyl sebacate, methyl-1,2,2,6,6-pentamethyl-4-piperidinyl sebacate, bis(1,2,2,6,6-pentamethyl-4-piperidinyl) sebacate, and 1,2,2,6,6-pentamethyl-4-piperidinol. This may be used in any amount effective to provide UV stabilization.

The coating can include one or more pigments to provide any desired color. The pigments can vary, depending on the desired color of the final coating. For example, if a gray coating is desired, white and black pigments can be used. If a yellow coating is desired, then yellow pigments can be employed, and so on. A representative example of a darkening pigment is black iron oxide. Black iron oxide also has the desirable property of being infrared transparent and thus may serve as an IR transparent darkening agent. This is beneficial because infrared absorption by the coating causes the surface temperature to rise, which is undesirable. Likewise, an IR reflector may be included in the coatings of this invention. One such IR reflector is titanium dioxide, which may also serve as a pigment. By reflecting IR light, the coating is less prone to becoming heated in sunlight.

Various fire retardants may optionally be used in the practice of this invention. Common fire retardants include an alumina such as alumina trihydrate, magnesium hydroxide, bismuth oxide, zinc borate, potassium tripolyphosphate, and antimony oxide. Combinations of these fire retardants can be employed, such as magnesium hydroxide with alumna trihydrate, and zinc borate with magnesium hydroxide and/or alumna trihydrate. Fire retardants that are not a known carcinogens are preferred in the practice of this invention. In general, the fire retardants may be employed in an amount of from about 5 to about 40 percent by weight based on the total weight of a given formulation.

On the amine side of the primer and topcoat, an amine curing agent is employed. Various polyamines can be used for this purpose, including aliphatic and aromatic amines, cycloaliphatic amines, a Lewis base or a Mannich base. For example, the aliphatic amine and cycloaliphatic amines may be alkylene diamines such as ethylene diamine, propylene diamine, 1,4-diaminobutane, 1,3-diaminopentane, 1,6-diaminohexane, 2,5-diamino-2,5-dimethylhexane, 2,2,4-trimethyl-1,6-diaminohexane, 1,11-diaminoundecane, 1,12-diaminododecane, 1,3- or 1,4-cyclohexame diamine, 1-amino-3,3,5-trimethyl-5-aminomethyl-cyclohexane, 2,4- or 2,6-hexahydrotolxylene diamine, 2,4'- or 4,4'-diaminodicyclohexyl methane, 3,3'-dialkyl-4,4'-diaminodicyclohexyl methane isophoronediamine, trimethylhexamethylene diamine, triethylene diamine, piperazine-n-ethylamine, polyoxyalkylene diamines made from propylene oxide and/or ethylene oxide. Commercially available amine curing agents may sometimes include residual amounts of solvents such as benzyl alcohol used in the manufacture of the compounds. The aromatic polyamines may include 2,4- or 2,6-diaminotoluene and 2,4'- or 4,4'-diaminodiphenyl methane. Mixtures of amine curing agents may be employed. The amount of amine curing agent may vary depending on the amount of epoxy resin to be cured. In general, the amount of amine curing agent employed is so that the volumetric ratio of an amine side to an epoxy side is from about 30:70 to about 70:30, with a weight ratio of from about 1:15 to 15:1 being most typical. Typically, the mole ratio of amine curing agent to the epoxy resin is in the range from about 0.25 to about 2.5, and in one embodiment is about 1:1.

The following examples are illustrative of this invention and are not intended to be limiting as to the scope of the invention or claims hereto. Unless otherwise denoted all percentages are by weight of the total part (i.e., the primer epoxy or topcoat amine and so forth).

EXAMPLE 1

A primer and topcoat were prepared containing the components and respective amounts shown in Tables 1a and 1b. Each of the sides was thoroughly mixed prior to application onto a metal surface. The components were mixed using low shear (1000 RPM), and when all the components have been added, the speed was increased to 2000-2500 RPM. In the table, the Lauscha Fiber International B-15-F (a thixatrope glass fiber reinforcing agent) has a BET of 1.08 square meters per gram, and a nominal diameter of 1.48 microns.

TABLE 1a

Primer Composition

| Amine Side | | | Epoxy Side | | |
|---|---|---|---|---|---|
| Supplier/Tradename/ | Component | Weight Percent | Supplier/Tradename/ | Component | Weight Percent |
| Vantico Hardener HY 2963 | Amine Curing Agent Cyclohexanemethanamine, 5-amino-1,3,3-trimethyl-Isophoronediamine Bisphenol A | 49.0 | Vantico Araldyte GY6010 | Epoxy Resin Phenol, 4,4'-(1-methylethylidene)bis-, polymer with (chloromethyl)oxirane Bisphenol A Diglycidyl Ether Polymer | 69.4 |
| B.F. Goodrich Hycar 1300X16 | Rubber Toughening Agent ATBN Aminoethyl piperazine | 17.0 | Rohm & Haas ELP-3 | Polysulfide Toughening Agent Epoxy terminated polysulphide | 23.5 |
| Sherwin-Williams MolyWhite 101 | Corrosion Inhibitor Zinc Molybdate Zinc Oxide | 1.4 | Sherwin-Williams MolyWhite 101 | Corrosion Inhibitor Zinc Molybdate Zinc Oxide | 0.6 |
| Alcan Chemicals Alumina Trihydrate H-10 | Fire Retardant $Al_2O_3 \cdot 3H_2O$ | 11.2 | Rockwood Industries Phos Plus | Corrosion Inhibitor $Zn_3(PO_4)_2$-2, -4 $H_2O$ Mixture | 0.3 |
| Laurel Industries Inc. Fireshield | Fire Retardant $Sb_2O_3$ | 20.6 | Heucotech Heucorin RZ | Corrosion Inhibitor Zinc-5-Nitro-Iso Phthalate | 0.03 |
| Degussa Aerosil 812 | Hydrophobic Moisture Penetration Inhibitor Amorphous Fumed Silica | 0.9 | Degussa Aerosil 812 | Hydrophobic Moisture Penetration Inhibitor Amorphous Fumed Silica | 0.5 |
| | | | Ferro UV 55-07051 | UV Light Stabilizer Bis(1,2,2,6,6-Pentamethyl-4-Piperidinyl)Sebacate | 2.0 |
| | | | LaPorte Black Iron Oxide | Darkening Pigment $Fe_3O_4$ | 1.2 |
| | | | Lauscha Fiber Internat. B-15-F | Thixatrope Glass Fiber Reinforcing Agent | 1.4 |
| Total | | 100.1 | | | 98.93 |

TABLE 1b

Top-Coat Composition

| Amine Side | | | Epoxy Side | | |
|---|---|---|---|---|---|
| Supplier/Tradename | Component | Weight Percent | Component | Supplier/Tradename | Weight Percent |
| Air Products Ancamime 2074 | Amine Curing Agent Isophoronediamine Trimethylhexamethylenediamine | 39.5 | Vantico Araldyte GY6010 | Epoxy Resin Phenol, 4,4'-(1-methylethylidene)bis-, polymer with (chloromethyl)oxirane Bisphenol A Diglycidyl Ether Polymer | 48.4 |
| B.F. Goodrich Hycar 1300X16 | Rubber Toughening Agent ATBN Aminoethyl piperazine | 3.9 | Rohm & Haas ELP-3 | Polysulfide Toughening Agent Epoxy terminated polysulfide | 16.1 |
| Ribelin Sales Zinc Oxide (Grade 210) | Corrosion Inhibitor; UV Reflector ZnO | 7.9 | LaPorte Black Iron Oxide | Darkening Pigment $Fe_3O_4$ | 4.8 |
| Alcan Chemicals Alumina Trihydrate H-10 | Fire Retardant $Al_2O_3 \cdot 3H_2O$ | 4.7 | Lauscha Fiber Internat. B-15-F | Thixatrope Glass Fiber Reinforcing Agent | 1.9 |
| Laurel Industries Inc. Fireshield ® | Fire Retardant $Sb_2O_3$ | 4.7 | Ferro UV 55-07051 | UV Light Stabilizer Bis(1,2,2,6,6-Pentamethyl-4-Piperidinyl)Sebacate | 2.0 |
| Kronos Titanium Dioxide P25 | Pigment | 11.8 | Atlantic Equipment Eng. Aluminum Powder | Aggregate Aluminum | 25.8 |
| Lauscha Fiber Internal. B-15-F | Thixatrope Glass Fiber Reinforcing Agent | 1.6 | | | |
| Atlantic Equipment Eng. Aluminum Powder | Aggregate Aluminum | 26.1 | | | |
| Total | | 100.2 | | | 99 |

Thus, the first amine side and first epoxy side were combined and mixed, then applied to a metal surface using a phenolic napless roller (or can be sprayed) to thereby form a primed surface. After the primer has cured to a tack free state, the second amine side and the second epoxy side are mixed and applied to the primed surface using a phenolic napless roller. Alternatively, and in some cases preferentially, the topcoat (the second amine side and epoxy side) is applied prior to the primer curing to the tack free state. In this regard the topcoat in some instances is applied within 60 seconds of the primer being applied. The surface can be cleaned prior to application of the primer. The rheology of the topcoat allows for the formation of the ridges and valleys which supplies additional slip resistance. The resulting coating was approximately 1-10 mm thick (1-2 mm of primer). The coating exhibited excellent durability when subjected to a standard impact test. The coating showed surprisingly little wear due to the impact. The impact test, conducted according to MIL-PRF-24667A (Navy), consists of dropping a 907 gram steel ball from a height of 244 cm onto the coated steel surface in a 5 by 5 array consisting of 25 impacts. Impact resistance is scored by counting the number of adjacent impact points where coating has been removed between the points of impact, multiplying this number by 2.5 percentage points and subtracting this from 100. A minimum score of 95% is expected for an acceptable material according to MIL-PRF-24667A (Navy). The coatings described herein typically score 100 in this test.

EXAMPLE 2

The procedures of Example 1 were repeated except that the primer and topcoat of Tables 2a and 2b were employed. In this example, antimony oxide and zinc oxide were removed from the coating of Tables 1a and 1b, with alumina trihydrate and titanium dioxide being used instead. Also, the zinc corrosion inhibitors were used in the primer amine side and some of the glass fiber was moved from the primer epoxy side to the primer amine side. Likewise, the amounts of zinc corrosion inhibitor and black iron oxide were increased in the primer epoxy side.

TABLE 2a

Primer Composition

| Amine Side | | | Epoxy Side | | |
|---|---|---|---|---|---|
| Supplier/Tradename | Component | Weight Percent | Supplier/Tradename | Component | Weight Percent |
| Vantico Hardener HY2963 | Amine Curing Agent Cyclohexanemethanamine, 5-amino-1,3,3-trimethyl- Isophoronediamine Bisphenol A | 49.0 | Vantico Araldyte GY6010 | Epoxy Resin Phenol, 4,4'-(1-methylethylidene)bis-, polymer with (chloromethyl)oxirane Bisphenol A Diglycidyl Ether Polymer | 69.4 |
| B.F. Goodrich Hycar 1300X16 | Rubber Toughening Agent ATBN Aminoethyl piperazine | 17.0 | Rohm & Haas ELP-3 | Polysulfide Toughening Agent Epoxy terminated polysulfide | 23.5 |
| Sherwin-Williams MolyWhite 101 | Corrosion Inhibitor Zinc Molybdate Zinc Oxide | 2.24 | Sherwin-Williams MolyWhite 101 | Corrosion Inhibitor Zinc Molybdate Zinc Oxide | 0.6 |
| Alcan Chemicals Alumina Trihydrate H-10 | Fire Retardant $Al_2O_3 \cdot 3H_2O$ | 31.8 | Rockwood Industries Phos Plus | Corrosion Inhibitor $Zn_3(PO_4)_2$-2, -4 $H_2O$ Mixture | 0.7 |
| Degussa Aerosil R812 | Hydrophobic Moisture Penetration Inhibitor Amorphous Fumed Silica | 0.9 | Heucotech Heucorin RZ | Corrosion Inhibitor Zinc-5-Nitro-Iso Phthalate | 0.03 |
| Lauscha Fiber Internat. B-15-F | Thixatrope Glass Fiber Reinforcing Agent | 1.0 | Degussa Aerosil R812 | Hydrophobic Moisture Penetration Inhibitor Amorphous Fumed Silica | 0.5 |
| | | | Ferro UV 55-07051 | UV Light Stabilizer Bis(1,2,2,6,6-Pentamethyl-4- Piperidinyl)Sebacate | 2.0 |
| | | | LaPorte Black Iron Oxide | IR Transparent, Darkening Pigment $Fe_3O_4$ | 1.7 |
| | | | Lauscha Fiber Internat. B-15-F | Thixatrope Glass Fiber Reinforcing Agent | 0.3 |
| Total | | 100.1 | | | 98.93 |

TABLE 2b

Top-Coat Composition

| Amine Side | | | Epoxy Side | | |
|---|---|---|---|---|---|
| Supplier/Tradename | Component | Weight Percent | Supplier/Tradename | Component | Weight Percent |
| Air Products Ancamime 2074 | Amine Curing Agent Isophoronediamine Trimethylhexamethylenediamine | 39.5 | Vantico Araldyte GY6010 | Epoxy Resin Phenol, 4,4'-(1-methylethylidene)bis-, polymer with (chloromethyl)oxirane Bisphenol A Diglycidyl Ether Polymer | 48.4 |
| B.F. Goodrich Hycar 1300X16 | Rubber Toughening Agent ATBN Aminoethyl piperazine | 3.9 | Rohm & Haas ELP-3 | Polysulfide Toughening Agent Epoxy terminated polysulfide | 16.1 |
| Alcan Chemicals Alumina Trihydrate H-10 | Fire Retardant $Al_2O_3 \cdot 3H_2O$ | 9.4 | LaPorte Black Iron Oxide | IR Transparent Darkening Pigment $Fe_3O_4$ | 4.8 |
| Kronos - Titanium Dioxide P25 | Pigment and IR Reflector | 19.7 | Lauscha Fiber Internat. B-15-F | Thixatrope Glass Fiber Reinforcing Agent | 1.9 |

TABLE 2b-continued

Top-Coat Composition

| | Amine Side | | | Epoxy Side | |
|---|---|---|---|---|---|
| Supplier/Tradename | Component | Weight Percent | Supplier/Tradename | Component | Weight Percent |
| Lauscha Fiber Internat. B-15-F | Thixatrope Glass Fiber Reinforcing Agent | 1.6 | Ferro UV 55-07051 | UV Light Stabilizer Bis(1,2,2,6,6-Pentamethyl-4-Piperidinyl)Sebacate | 2.0 |
| Atlantic Equipment Eng. Aluminum Powder | Aggregate Aluminum | 26.1 | Atlantic Equipment Eng. Aluminum Powder | Aggregate Aluminum | 25.8 |
| Total | | 100.2 | | | 99 |

The primer sides and topcoat sides were applied to a clean steel plate substrate according to Example 1. The cured coating was subjected to the impact test of Example 1. The cured coating showed excellent durability and surprisingly little wear.

EXAMPLE 3

Polythioether Formulations

Several formulations were prepared using either an epoxidized polysulfide or an epoxidized polythioether (PERMAPOL polythioether, obtained from PRC DeSoto). While the epoxidized polysulfide is a linear pre-polymer containing di-sulfide bridges spaced periodically through the molecule, the epoxidized polythioether contains —S— bridges spaced periodically through the molecule. While not wishing to be bound by theory, it is thought that the sulfur linkage is more flexible than the S—S di-sulfide linkages, which results in a superior product when using the epoxidized polythioether relative to the polysulfide. In addition, the PERMAPOL polythioether has lower viscosity than the ELP3, which allows less polythioether being needed relative to the ELP3 polysulfide to achieve the same rheology. Five formulations were tested to determine the amount of polythioether that corresponds to a standard polysulfide formulation. The formulations are shown in Table 3A, with the results of the tests shown in Table 3B.

The formulation in Table 3A were used to form cured compositions of a primer coating and topcoat coating. The resulting cured coatings were tested to determine Shore D hardness and flexibility. Flexibility was measured using a four-point bend configuration in an Instron test machine operated in compression (ASTM D6272). The four-point bend test generated data for flexural modulus and the ultimate yield stress, which indicate flexibility and strength, respectively. The data is shown in Table 3B.

TABLE 3A

| Sample | Polysulfide (ELP3) | Polythioether (PERMAPOL 5534) | Epoxy resin (ARYLDYTE GY6010 | Hardener type | Resin/hardener ratio |
|---|---|---|---|---|---|
| A | 25.83 | 0 | 74.17 | A mixture[a] of Ancamine HY 2964 and Hycar 1300X16 | 2.33 |
| B | 0 | 25.83 | 74.17 | A mixture[a] of Ancamine HY2964 and Hycar 1300X16 | 2.29 |
| C | 0 | 20.67 | 79.33 | A mixture[a] of Ancamine HY 2964 and Hycar 1300X16 | 2.20 |
| D | 0 | 15.51 | 84.49 | A mixture[a] of Ancamine HY2964 and Hycar 1300X16 | 2.11 |
| E | 0 | 10.33 | 89.67 | A mixture[a] of Ancamine HY 2964 and Hycar 1300X16 | 2.04 |

[a]90.80% of the HY-2964 and 9.20% of the Hycar 1300X16

Sample A and B have equal amounts by weight of polysulfide and polythioether, respectively. Sample C has 80% of polythioether relative to the amount of polysulfide in Sample A, with the balance being made up with additional epoxy resin. Samples D and E have 60% and 40%, respectively, of polythioether relative to the amount of polysulfide in Sample A.

TABLE 3B

| Sample | Shore D Hardness | | | | Max Load at Yield (PSI) | | | | Modulus at X % Deformation (PSI) | | | |
|---|---|---|---|---|---|---|---|---|---|---|---|---|
| | Meas 1 | Meas 2 | Meas 3 | Average | Meas 1 | Meas 2 | Meas 3 | Average | Meas 1 | Meas 2 | Meas 3 | Average |
| Steel Paint Can Lid | 87 | 90 | 88.5 | 88.5 | | | | | | | | |
| ELP3 (Ambient Cure) | 74 | 77 | 77.5 | 76.2 | 3353.2 | 3256.4 | 3852.4 | 3487.3 | 166416.0 | 149941.7 | 188407.5 | 168,255 |
| ELP3 (85 F cure) | 75 | 72.5 | 73.5 | 73.7 | | | | | | | | |
| 100% Permapol 5534 (Ambient Cure) | 76.5 | 71.5 | 70.5 | 72.8 | 1724.607 | 1971.898 | 1978.985 | 1891.8 | 86007.4 | 82614.3 | 69763.3 | 79,461 |
| 100% Permapol 5534 (85 F Cure) | 70 | 69.5 | 75.5 | 71.7 | | | | | | | | |
| 80% Permapol 5534 (Ambient Cure) | 77 | 79 | 77.5 | 77.8 | 3803.913 | 3728.068 | 3929.925 | 3820.6 | 44612.1 | 55699.7 | 69842.7 | 56,718 |
| 80% Permapol 5534 (85 F Cure) | 74.5 | 77 | 78 | 76.5 | | | | | | | | |
| 60% Permapol 5534 (Ambient Cure) | 76.5 | 78 | 78.5 | 77.7 | 5341.757 | 4887.624 | 4949.777 | 5059.7 | 208745.4 | 222708.6 | 234415.8 | 221,957 |
| 60% Permapol 5534 (85 F Cure) | 76.5 | 77 | 81.5 | 78.3 | | | | | | | | |
| 40% Permapol 5534 (Ambient Cure) | 76 | 76.5 | 76.5 | 76.3 | 6665.947 | 6499.856 | 6671.931 | 6612.6 | 304203.1 | 289920.5 | 314518.2 | 302,881 |
| 40% Permapol 5534 (85 F Cure) | 81 | 79.5 | 80.5 | 80.3 | | | | | | | | |

The data in Table 3B shows that essentially the same physical properties can be achieved using the polythioether (Permapol 5534) in place of the polysulfide (ELP3), but with only about 60% by weight of the polythioether relative to the polysulfide.

TABLE 3C

| | Aluminum Aggregate | | Garnet Aggregate | |
|---|---|---|---|---|
| Component | ELP3/EPS25 %/Wt. | Permapol %/Wt. | ELP3/EPS25 %/Wt. | Permapol %/Wt. |
| Primer Activator: | | | | |
| Hardener HY2963 | 44.29 | 44.30 | 44.29 | 44.30 |
| Hycar 1300X16 | 15.79 | 15.80 | 15.79 | 15.80 |
| Molywhite | 1.85 | 1.90 | 1.85 | 1.90 |
| Alumina trihydrate DH-80G | 28.80 | 28.80 | 28.80 | 28.80 |
| Aerosil R812 | 0.84 | 0.80 | 0.84 | 0.80 |
| 2160 TiO2 | 8.42 | 8.40 | 8.42 | 8.40 |
| Total: | 99.99 | 100.00 | 99.99 | 100.00 |
| Primer Base: | | | | |
| Araldyte GY6010 | 72.30 | 81.48 | 72.30 | 81.48 |
| EPS2S/ELP-3 | 23.90 | — | 23.90 | — |
| Permapol | — | 14.95 | — | 14.95 |
| Black Iron Oxide | 0.50 | 0.25 | 0.50 | 0.25 |
| Phos Plus | 0.80 | 0.80 | 0.80 | 0.80 |
| Heucorin RZ | 0.08 | 0.08 | 0.08 | 0.08 |
| Aerosil R812 | 0.50 | 0.48 | 0.50 | 0.48 |
| Silquest A-187 | 2.00 | 1.96 | 2.00 | 1.95 |
| Total: | 100.08 | 100.00 | 100.08 | 100.00 |
| Topcoat Activator: | | | | |
| Ancamine 2074 | 31.60 | 31.80 | 31.60 | 31.80 |
| Hycar 1300X16 | 3.22 | 3.20 | 3.22 | 3.20 |
| Alumina trihydrate | 15.36 | 15.30 | 15.36 | 15.30 |
| Titanium dioxide, Kronos 2160 | 7.12 | 7.10 | 7.12 | 7.10 |
| Glass Microfiber, B-15-F | 0.75 | 0.80 | 0.75 | 0.80 |
| Aluminum Tadpoles T-103 | 30.71 | 30.70 | — | — |
| Aluminum Powder, Al-110 | 10.48 | 10.50 | — | — |
| Garnet Aggregate | — | — | 41.43 | 41.30 |
| Fumed Silica, CAB-O-SIL | 0.52 | 0.50 | 0.52 | 0.50 |
| Total: | 99.76 | 99.99 | 100.00 | 100.00 |
| Topcoat Base: | | | | |
| Araldyte GY6010 | 28.75 | 32.75 | 28.75 | 32.75 |
| EPS2S/ELP-3 | 10.02 | — | 10.02 | — |
| Permapol | — | 6.00 | — | 6.00 |
| Black Iron Oxide | 8.47 | 8.47 | 8.47 | 8.47 |
| B-15-F Glass Fiber | 1.34 | 1.34 | 1.34 | 1.34 |
| Ferro UV Inhibitor, 55-07051 | 4.96 | 4.96 | 4.96 | 4.96 |
| Aluminum Tadpoles, T-103 | 34.43 | 34.45 | — | — |
| Aluminum Powder, AL-110 | 11.02 | 11.02 | — | — |
| Garnet Aggregate | — | — | 45.45 | 45.47 |
| Fumed Silica, CAB-O-SIL | 1.01 | 1.01 | 1.01 | 1.01 |
| Total: | 100.00 | 100.00 | 100.00 | 100.00 |

The aluminum aggregate primer formulations of Table 3C were tested by bonding one-inch-wide adherends on steel with a one-inch overlap using primers made using polysulfide and polythioether. For comparison, the primers from two commercially available products were also tested. The bonded assemblies were pulled apart using an Instron test machine. The results shown in Table 3D, and given in absolute pounds of pull required to break the samples. Each result is the average of five tests. The result for the polythioether sample is low because one sample had to be pulled twice because it first reached the maximum level for the load cell used, which weakened the adhesive bond.

TABLE 3D

| Sample | Results (absolute pounds of pull to break sample) |
|---|---|
| Amercoat 138, a solvent born epoxy primer[a] | 299 |
| American Safety 440L primer[a] | 679 |
| Polysulfide primer | 2178 |
| Polythioether primer (60% formulation) | 2599 |

[a]Amercoat 138 and American Safety 440L are commercially available primers, which are not embodiments of this invention, and included for comparative purposes.

The results show the superiority of primers made using polysulfide and polythioether, owing so the significantly higher adhesion to steel and toughness than the commercial products which lack either polysulfide or polythioether.

The formulations in Table 3C were also tested to determine wear properties of the coating using test MIL-PRF-24667A (U.S. Navy). This test is designed to simulate the wear produced by the trap cables on aircraft carriers. The test involves dragging a cable simulant across the coating for 500 cycles. The simulant is a steel rod having the same hardness as the steel in a cable. A thirty-pound load is applied to the simulant. The sample is periodically weighed to determine the quantity of coating removed by abrasion. Normally the test proscribes 500 test cycles; however, in this example, 5,000 test cycles were obtained. The specification for a U.S. Navy non-skid (MIL-PRF-24667A) requires no more than 10% of the weight of the coating be removed after 500 cycles. The results of a formulation using polythioether does not experience this level of wear until about 4,000 cycles are exceeded.

The polythioether formulation of Table 3C was also subjected to tests under MIL-PRF-24667 to test resistance to wear and abrasion of a cable stimulant. As per MIL-PRF-24667, an aircraft carrier cable stimulant is rubbed over a coating sample, with 30 pounds of pressure applied. The cable is drug back and forth, with each back and forth pass equaling one cycle. Three samples were tested. MIL-PRF-24667 specifies that a sample passes the test procedure a maximum average of 0.025 millimeter loss after 200 cycles for abrasion of the cable, and a maximum average of 10% weight loss per sample after 500 cycles for the coating wear. Sample 1 showed abrasion in millimeters of 0.021 after 200 cycles, and 9.2% loss for the wear test after 500 cycles. Sample 2 showed abrasion in millimeters of 0.019 after 200 cycles, and 3.45% loss for the wear test after 500 cycles. Sample 3 showed abrasion in millimeters of 0.008 after 200 cycles, and 3.03% loss for the wear test after 500 cycles. Hence, all three polythioether samples passed the requirements of MIL-PRF-24667 for these tests.

The coating made from a formulation using polythioether were subjected to an impact test by dropping a two-pound ball on the surface of the coating from a height of eight feet, which is repeated twenty-five times in a five-by-five array. The centers of the impact points are one inch apart. Failures are counted when the coating chips away from the surface between adjacent impact points. According to MIL-PRF-24667 no more than an average of two failures are allowed. No failures occurred in four panels tested, where the panels were of a formulation made with polythioether.

In addition, a coating made using polythioether was tested to measure flammability of the cured coating and its ability to quench a fire once initiated on the surface. The formulation passed the requirements of the MIL-PRF-24657A specifications.

The coatings made using polythioether were also subject to a coefficient of friction test with the coating dry, wet by sea water simulant, and coated with oil, which are intended to represent the extremes of conditions on an aircraft carrier deck. The results showed an acceptably high coefficient of friction under MIL-PDF-24667A relative to a standard surface. The results are shown in Table 3E.

TABLE 3E

| Coefficient of Friction | Sample 1 | Sample 2 | Sample 3 |
|---|---|---|---|
| Dry (50 wear cycles) | 1.09 | 1.15 | 1.16 |
| Wet (50 wear cycles) | 1.20 | 1.21 | 1.24 |
| Oily (50 wear cycles) | 0.82 | 0.85 | 0.75 |
| Dry (500 wear cycles) | 1.26 | 1.12 | 1.27 |
| Wet (500 wear cycles) | 1.46 | 1.11 | 1.34 |
| Oily (500 wear cycles) | 0.99 | 0.78 | 0.75 |

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as illustrative embodiments. Equivalent elements or materials may be substituted for those illustrated and described herein, and certain features of the invention may be utilized independently of the use of other features, all as would be apparent to one skilled in the art after having the benefit of this description of the invention.

What is claimed is:

1. A process for providing a coating for a solid surface, comprising:
applying a coating onto the solid surface, wherein the coating is prepared from
an amine side which comprises a mixture of:
an amine curing agent, other than the epoxide-containing toughening agent
a rubber toughening agent; and
an epoxy side which comprises a mixture of:
an epoxy resin,
an epoxide-containing toughening agent, and
wherein the coating is also prepared from a fire retardant, an optional glass fiber thixotrope and impact toughening agent, a pigment, and an optional abrasive aggregate, and
wherein the surface may be primed or un-primed prior to application of the topcoat.

2. The process of claim 1 wherein the coating is also prepared from a corrosion inhibitor.

3. The process of claim 1 wherein the coating is also prepared from a moisture penetration inhibitor.

4. The process of claim 1 wherein the coating is also prepared from an ultraviolet light stabilizer.

5. The process of claim 1, wherein the epoxide-containing toughening agent contains sulfur.

* * * * *

UNITED STATES PATENT AND TRADEMARK OFFICE
CERTIFICATE OF CORRECTION

| | | |
|---|---|---|
| PATENT NO. | : 7,435,451 B1 | Page 1 of 1 |
| APPLICATION NO. | : 11/415862 | |
| DATED | : October 14, 2008 | |
| INVENTOR(S) | : George P. Hansen et al. | |

It is certified that error appears in the above-identified patent and that said Letters Patent is hereby corrected as shown below:

Claim 6 is missing, column 20, line 66, insert --The process of claim 1, wherein the epoxide containing toughening agent is a polysulfide, a polythioether, or a combination thereof.--.

Signed and Sealed this
Ninth Day of August, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,435,451 B1 | Page 1 of 2 |
| APPLICATION NO. | : 11/415862 | |
| DATED | : October 14, 2008 | |
| INVENTOR(S) | : George P. Hansen et al. | |

It is certified that error appears in the above-identified patent and that said Letters Patent is hereby corrected as shown below:

Delete the title page and substitute therefore the attached title page showing the corrected number of claims in patent.

Claim 6 is missing, column 20, line 66, insert --The process of claim 1, wherein the epoxide containing toughening agent is a polysulfide, a polythioether, or a combination thereof.--.

This certificate supersedes the Certificate of Correction issued August 9, 2011.

Signed and Sealed this
Thirtieth Day of August, 2011

David J. Kappos
*Director of the United States Patent and Trademark Office*

(12) United States Patent
Hansen et al.

(10) Patent No.: US 7,435,451 B1
(45) Date of Patent: Oct. 14, 2008

(54) COATING WITH SIDES OF AMINE CURING AGENT AND RUBBER TOUGHENER, AND EPOXY RESIN AND EPOXIDE-CONTAINING TOUGHENER

(75) Inventors: George P. Hansen, Austin, TX (US); Rock A. Rushing, Spicewood, TX (US); John W. Bulluck, Spicewood, TX (US); Joshua B. Lightfoot, Austin, TX (US); Brad A. Rix, Spicewood, TX (US)

(73) Assignee: Texas Research International, Inc., Austin, TX (US)

(*) Notice: Subject to any disclaimer, the term of this patent is extended or adjusted under 35 U.S.C. 154(b) by 401 days.

(21) Appl. No.: 11/415,862

(22) Filed: May 2, 2006

Related U.S. Application Data

(60) Division of application No. 10/683,976, filed on Oct. 10, 2003, now Pat. No. 7,037,958, which is a continuation-in-part of application No. 09/939,204, filed on Aug. 24, 2001, now Pat. No. 6,632,860.

(51) Int. Cl.
| | |
|---|---|
| B05D 1/02 | (2006.01) |
| B05D 1/28 | (2006.01) |
| B05D 1/38 | (2006.01) |
| C08K 3/22 | (2006.01) |
| C08K 7/14 | (2006.01) |
| C08L 63/00 | (2006.01) |
| C08L 63/02 | (2006.01) |

(52) U.S. Cl. .......... 427/428.01; 427/410; 427/421.1; 523/428; 523/434; 525/113

(58) Field of Classification Search .......... None
See application file for complete search history.

(56) References Cited

U.S. PATENT DOCUMENTS

| | | | |
|---|---|---|---|
| 3,962,168 A | 6/1976 | Edwards | 260/29.6 |
| 4,205,109 A | 5/1980 | France et al. | 428/150 |
| 4,292,213 A | 9/1981 | Elliott et al. | 260/2.3 |
| 4,708,978 A | 11/1987 | Rodgers | 524/5 |
| 4,744,725 A | 5/1988 | Matarese et al. | 415/172 |
| 4,760,103 A | 7/1988 | Kraft et al. | 523/150 |
| 4,774,278 A | 9/1988 | Yoshioka et al. | 524/506 |
| 4,859,522 A | 8/1989 | Cambon | 428/215 |
| 4,961,973 A | 10/1990 | Molnar | 427/423 |
| 5,077,137 A | 12/1991 | Molnar | 428/601 |
| 5,084,521 A | 1/1992 | White | 523/436 |
| 5,094,902 A | 3/1992 | Haenggi et al. | 428/150 |
| 5,110,657 A | 5/1992 | Ainslie | 428/141 |
| 5,124,178 A | 6/1992 | Haenggi et al. | 427/204 |
| 5,198,065 A * | 3/1993 | Eadara | 156/315 |
| 5,367,024 A | 11/1994 | Neckermann | 525/123 |
| 5,395,673 A | 3/1995 | Hunt | 428/148 |
| 5,431,960 A | 7/1995 | Watts | 427/359 |
| 5,445,670 A | 8/1995 | Each et al. | 106/3 |
| 5,494,729 A | 2/1996 | Henry et al. | 428/147 |
| 5,561,173 A | 10/1996 | Dry | 523/218 |
| 5,660,624 A | 8/1997 | Dry | 106/677 |
| 5,686,507 A | 11/1997 | Hermele et al. | 523/153 |
| 5,989,328 A | 11/1999 | Stahovic et al. | 106/36 |
| 5,989,334 A | 11/1999 | Dry | 106/677 |
| 5,990,234 A | 11/1999 | Stahovic et al. | 524/839 |
| 6,248,204 B1 | 6/2001 | Schuft | 156/305 |

FOREIGN PATENT DOCUMENTS

JP    6-145630 A   *   5/1994

* cited by examiner

*Primary Examiner*—Robert Sellers
(74) *Attorney, Agent, or Firm*—O'Keefe, Egan, Peterman & Enders, LLP

(57) ABSTRACT

This invention concerns an epoxy coating for use as a non-skid surface for applications such as the deck of an aircraft carrier. The epoxy coating can be formulated from (a) an amine curing agent, (b) an epoxide-containing toughening agent such as a polysulfide and/or a polythioether, (c) an epoxy resin, (d) a rubber toughening agent, and (e) an optional fire retardant, a glass fiber thixotrope and impact toughening agent, an optional pigment, an optional corrosion inhibitor, an optional moisture penetration inhibitor, an optional ultraviolet light stabilizer, an optional abrasive aggregate, or a combination thereof.

6 Claims, No Drawings